No. 614,746. Patented Nov. 22, 1898.
C. OBERFELD & P. BRAUNBECK.
BAKER'S OVEN.
(Application filed Dec. 14, 1897.)
(No Model.) 4 Sheets—Sheet I.
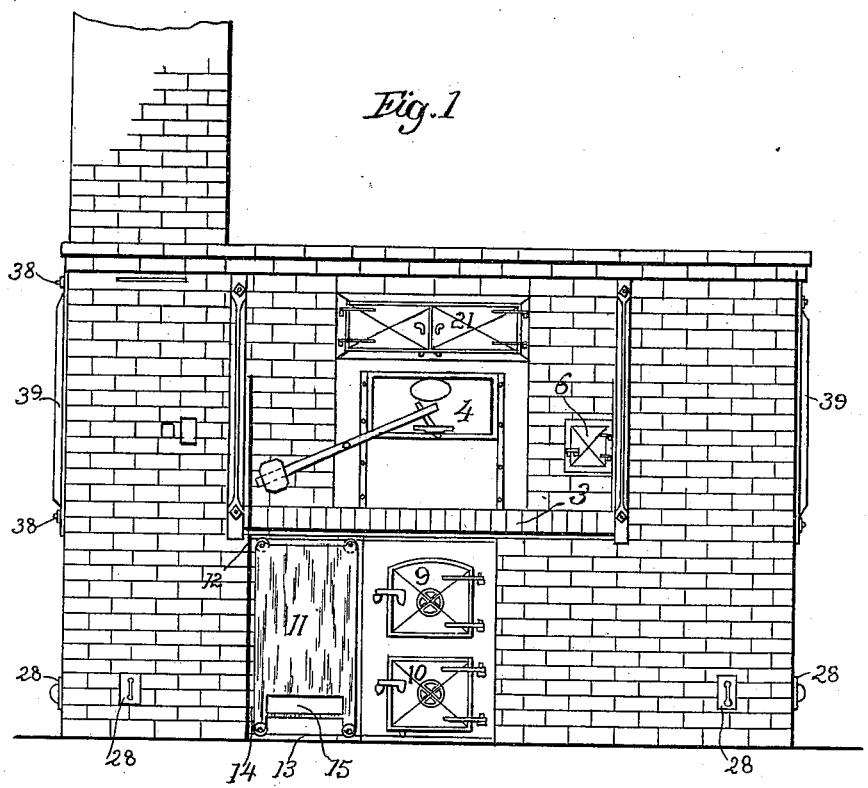
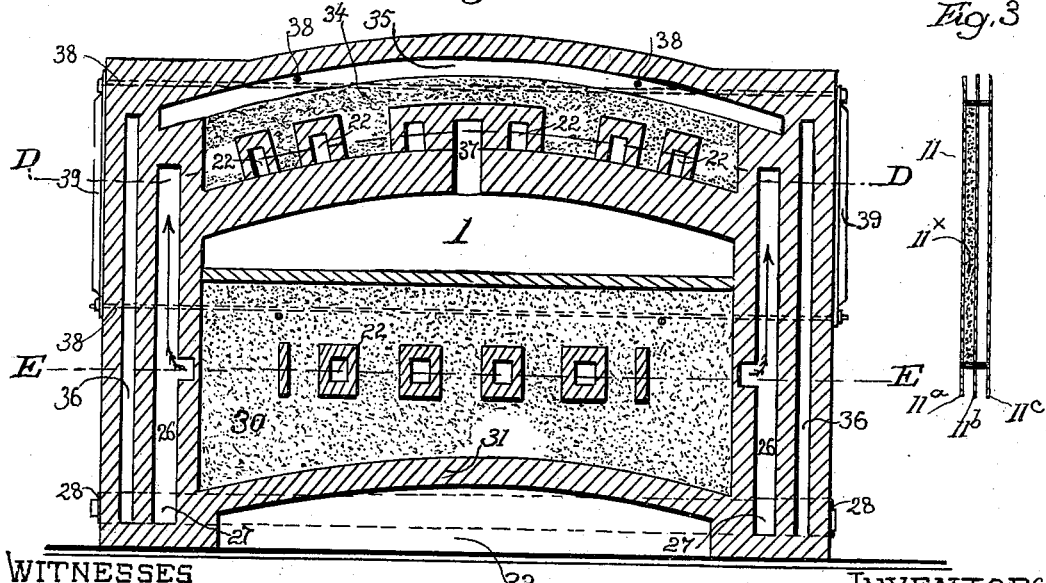

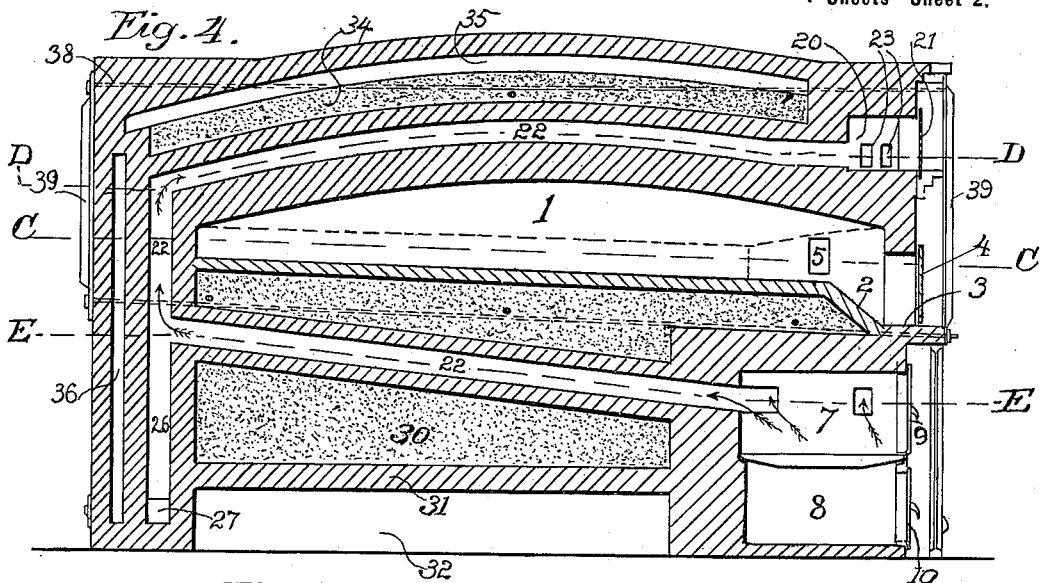

No. 614,746. Patented Nov. 22, 1898.
C. OBERFELD & P. BRAUNBECK.
BAKER'S OVEN.
(Application filed Dec. 14, 1897.)
(No Model.) 4 Sheets—Sheet 3.
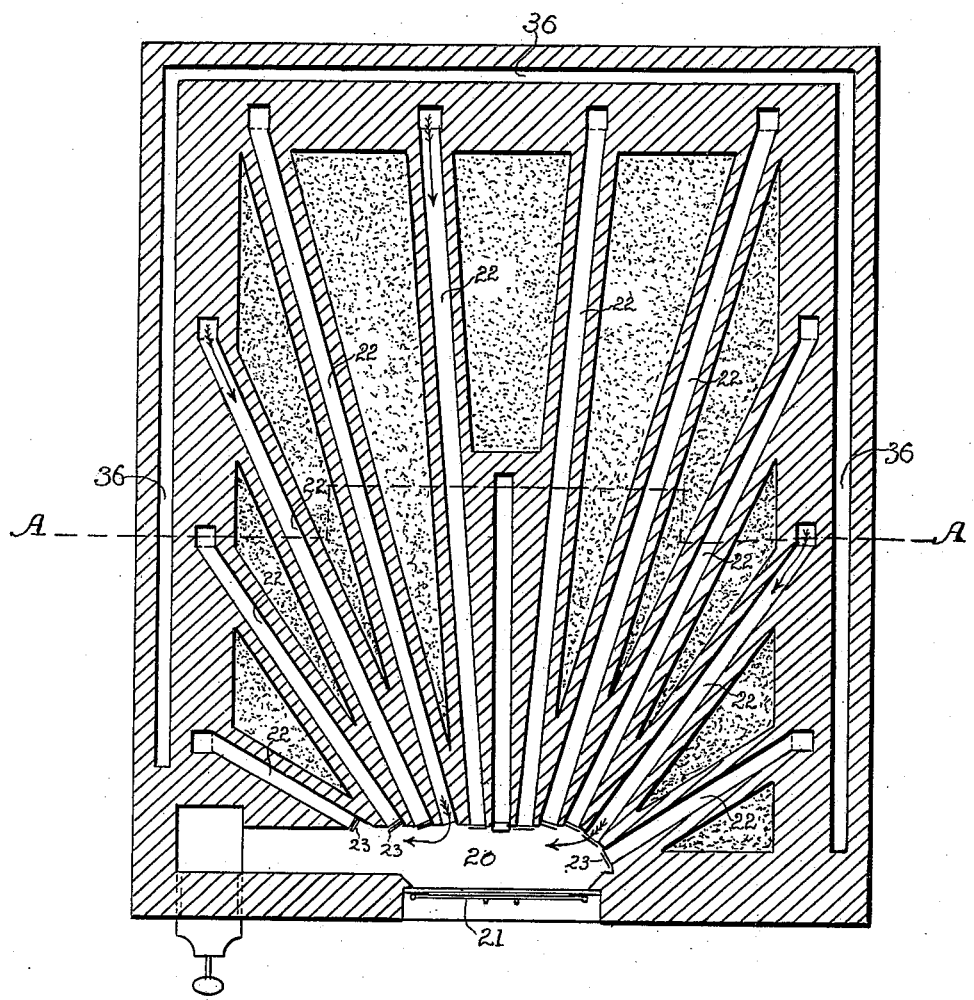

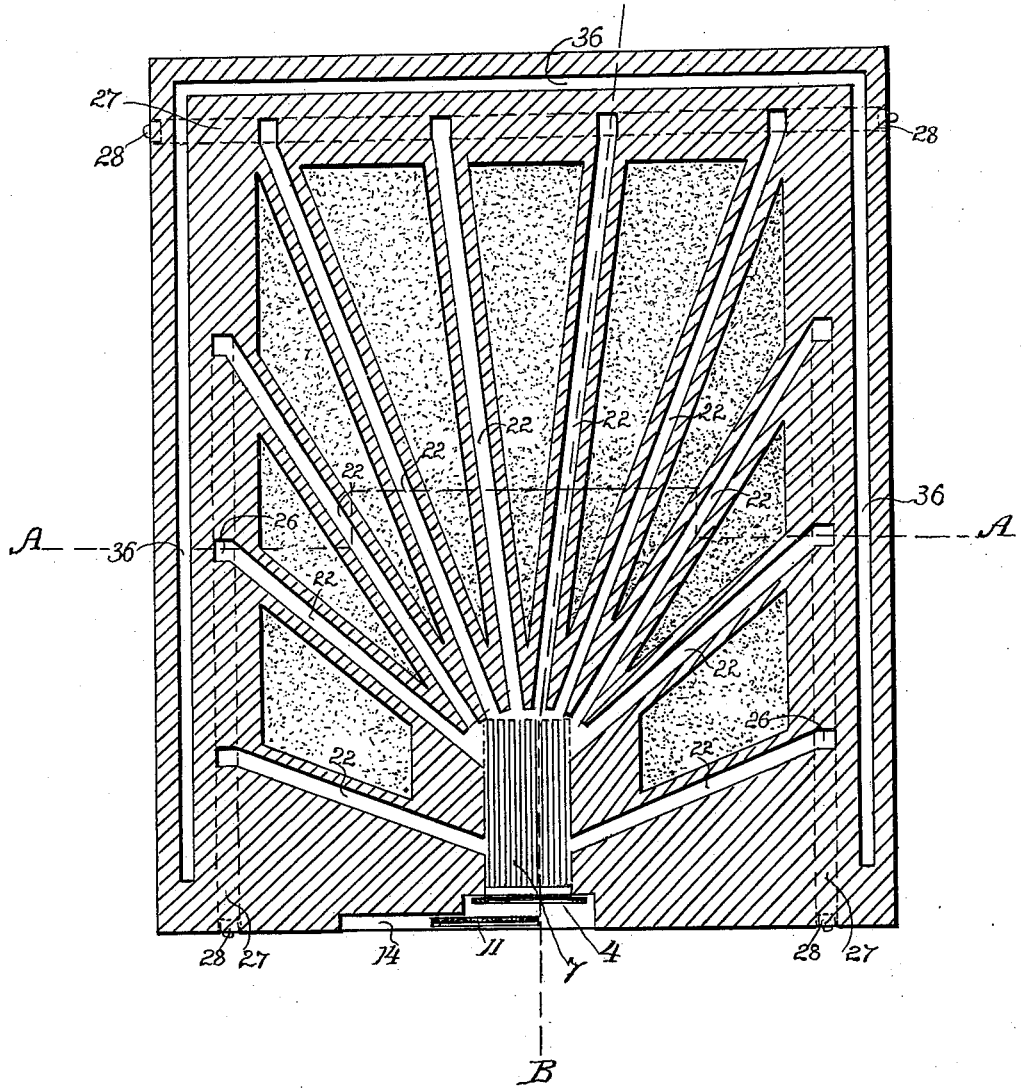

UNITED STATES PATENT OFFICE.

CHARLES OBERFELD AND PETER BRAUNBECK, OF SAN FRANCISCO, CALIFORNIA.

BAKER'S OVEN.

SPECIFICATION forming part of Letters Patent No. 614,746, dated November 22, 1898.

Application filed December 14, 1897. Serial No. 661,912. (No model.)

*To all whom it may concern:*

Be it known that we, CHARLES OBERFELD and PETER BRAUNBECK, citizens of the United States, residing at San Francisco, in the county of San Francisco and State of California, have invented certain new and useful Improvements in Bakers' Ovens; and we do hereby declare the following to be a full, clear, and exact description of said invention, such as will enable others skilled in the art to which it most nearly appertains to make, use, and practice the same.

Our invention relates to improvements in bakers' ovens, the object of our invention being to provide an oven of this character to which heat can be conveniently applied without interfering with the operation of baking and in which the heat can be very exactly regulated and directed to any desired portion of the baking-chamber.

Our invention further resides in the novel construction, combination, and arrangement of parts hereinafter fully specified, and particularly pointed out in the claims.

In the accompanying drawings, Figure 1 is a front elevation of our improved oven. Fig. 2 is a transverse vertical section on the line A A of Figs. 6 and 7. Fig. 3 is a vertical section of the fire-box shield. Fig. 4 is a longitudinal vertical section on the line B B of Figs. 6 and 7. Fig. 5 is a horizontal section on the line C C of Fig. 4. Fig. 6 is a section on the line D D of Figs. 2 and 4, and Fig. 7 is a section on the line E E of Figs. 2 and 4.

1 represents the baking-chamber. Its roof is arched both longitudinally and transversely, as shown in Figs. 2 and 4. The floor of the baking-chamber slopes downward toward the mouth, as shown at 2, and extends outside the door-place in a shelf 3. The chamber is closed in front by a vertically-sliding door 4, and the front wall of said chamber is provided with a light-box 5, closed by a door 6, in which box a light can be inserted when it is desired to illuminate the baking-chamber to inspect the condition of the contents thereof.

7 represents the fire-box, 8 the ash-box, and 9 10 the doors therefor. To protect the operator standing at the door of the baking-chamber from the effect of the heat of the fire-box, there is provided a shield 11, composed of three sheets of steel, with an intermediate sheet $11^x$, of asbestos or the like non-conducting material, interposed between the two sheets $11^a$ $11^b$ nearer the fire-box and an air space between the outer two sheets $11^b$, $11^c$. Said shield moves between upper and lower guides 12 13 and is moved to the left into the recess 14 when it is desired to open the doors of the fire-box or ash-box. The shield is suitably apertured, as shown at 15, at the bottom to permit a sufficient supply of air to the fire-box. The lower guide 13 is formed in or on the floor and the upper guide 12 on the under side of the overhanging shelf 3.

The object of our invention has been to provide a system of flues and regulating devices therefor by means of which from a comparatively small fire-box located below the entrance to the baking-chamber the baking-chamber shall be heated uniformly throughout as nearly as possible and in which the heat may be directed to any desired part of the baking-chamber very speedily and without delay on the part of the operator after he has inspected the contents of said chamber through the door 4. With this object in view we provide a draft-regulating chamber 20 immediately above the entrance to the baking-chamber, said chamber 20 being closed by doors 21. The fire-box 7 is located vertically beneath said entrance to the baking-chamber, and there are a number of independent flues 22, leading from the fire-box and into the draft-regulating chamber 20. The flues 22 radiate or diverge from the fire-box, some to the rear of the oven and some to the sides thereof. They then ascend past the back and sides of the baking-chamber, as shown in Figs. 2 and 4, and then converge to the draft-regulating chamber 20. At the entrance into said chamber they are provided with independently-operated dampers 23, which are easily accessible through the doors 21 of said chamber. By reason of the fact that each of the flues 22 throughout its entire length around the baking-chamber from the fire-box to the draft-regulating chamber is separate and independent of all the other flues and of the further fact that the upper part of each flue above the baking-chamber is located above the same portion or area of said chamber, below which is situated the lower part of said flue, the result is obtained that each portion of the baking-chamber can have its heat regulated very exactly by opening or closing the flue or flues passing directly below and directly above said portion. Furthermore, on account of the flues discharging into a common draft-regulating chamber immediately above the entrance to the baking-chamber this regulation or adjustment of the heat in the different portions of the baking-chamber can be made very quickly by the operator without moving from his position in front of the baking-chamber immediately after he has inspected the contents of the baking-chamber through its entrance and has discovered from the condition of said contents that such adjustment is necessary at some point or points.

For the purpose of removing the soot accumulating in the flues each of the vertical portions of the flues 22 at the side and rear of the oven has a downward extension 26, said extensions discharging into horizontal channels 27, opening at 28 in the sides and front of the oven. The soot which has accumulated in the horizontal portions of the flues 22 can readily be pushed into the vertical portions, whence it will fall through the extensions 26 into the channels 27, from which it can be removed by the openings 28.

In order to economize the heat and likewise to distribute the heat as evenly as possible, the lower portions of the flues 22 are laid in a thick bed 30, of sand, supported by an arch 31, said arch forming an air-space 32 with the floor. Said lower portions slope upward to the rear, whereby the diminution in temperature of the gases in said flues at the rear of the oven is compensated by a diminution in the thickness of the intervening layer of sand between the flues and the baking-chamber. The upper portions of the flues are laid on the top of the baking-chamber and are surrounded and covered by a bed 34, of sand, an air-space 35 being interposed between said bed and the top of the oven. A vertical air-space 36 is also provided between the brickwork surrounding the vertical flues and the outer walls of the oven.

For the purpose of ventilating the oven when desired a conduit 37 is provided, leading from the top of the baking-chamber to the draft-regulating chamber 20. This can be opened or closed, as may be found necessary.

The walls of the oven are braced together by braces 38 and anchor-rods 39.

It will readily be seen that by means of the diverging lower flue-sections and converging upper flue-sections, each flue being entirely separate from and independent of the others throughout its length and said flues leading to and past the sides of the baking-chamber as well as the rear thereof, we are able to direct the heat to the front portion of the baking-chamber, or to the rear portion, or to either side thereof, as may be desired. If it is desired to increase the heat in the right side of the baking-chamber, the flues leading to the left side are shut off, and vice versa. If it is desired to heat more especially the rear portion, those flues which lead to both sides of the oven are shut off, and since the heat from these flues when in use has a comparatively slight heating effect on the rear of the oven it is evident that dampening said flues increases the heat from the remaining flues and therefore in the rear of the baking-chamber. In like manner to increase the heat in the front portion of the baking-chamber, the flues leading to the rear of the oven would be shut off.

The downward extensions 26, channels 27, and openings 28 can be used for cooling off the oven at any point, since by exposing the channels 27 to the outer air by the openings 28 cold air can be admitted into such flues as are desired.

Having thus described our invention, we claim—

1. In a baker's oven, the combination, with the baking-chamber, of a fire-box located beneath the mouth of said baking-chamber, an upper chamber located above said mouth, independent flues radiating from said fire-box to the sides and rear of the baking-chamber, then extending upwardly past said sides and rear, and then converging to the upper chamber, and a chimney with which said chamber is connected, substantially as described.

2. In a baker's oven, the combination, with the baking-chamber, of a fire-box located beneath the mouth of said baking-chamber, an upper chamber located above said mouth, flues radiating from said fire-box to the sides and rear of the baking-chamber, then extending upwardly past said sides and rear, and then converging to the upper chamber, each flue being independent of the other flues throughout its entire length, and the lower portion of each flue, beneath the baking-chamber, being substantially parallel with the upper return portion above said baking-chamber, means for independently regulating said flues, and a chimney with which said chamber is connected, substantially as described.

3. In a baker's oven, the combination, with a baking-chamber, of a fire-box below the mouth of said chamber, flues radiating from said fire-box below said chamber to the sides and rear of the oven, then extending upward past said chamber, and then converging above said chamber to a contracted area above the fire-box, each flue being independent of the other flues throughout its entire length, downward extensions from the vertical portions of said flues, and a channel or passage connecting the lower ends of said extensions and opening in a side of the oven, substantially as described.

4. In a baker's oven, the combination, with a baking-chamber, of a fire-box below the mouth of said chamber, flues radiating from said fire-box below said chamber to the sides and rear of the oven, then extending upward past said chamber, and then converging above said chamber to a contracted area above the fire-box, each flue being independent of the other flues throughout its entire length, and the lower portion of each flue, beneath the baking-chamber, being substantially parallel with the upper return portion above said baking-chamber, downward extensions from the vertical portions of said flues, and a channel or passage connecting the lower ends of said extensions and opening in a side of the oven, substantially as described.

CHARLES OBERFELD.
PETER BRAUNBECK.

Witnesses:
HARRY J. LASK,
CHAS. J. ARMBRUSTER.